United States Patent [19]
Olcott et al.

[11] 3,850,388
[45] Nov. 26, 1974

[54] INTEGRATED LIFT/DRAG CONTROLLER FOR AIRCRAFT

[75] Inventors: John W. Olcott, Basking Ridge; Edward Seckel, Princeton; David R. Ellis, Hopewell, all of N.J.

[73] Assignee: The United States of America as represented by the Administrator of the National Aeronautics and Space Administration, Washington, D.C.

[22] Filed: Mar. 23, 1972

[21] Appl. No.: 237,491

[52] U.S. Cl. .......... 244/75 R, 74/480 R, 244/83 R, 416/25
[51] Int. Cl. ......................... B64c 13/12
[58] Field of Search..... 244/75 R, 76 R, 76 A, 76 J, 244/83 R, 83 B, 83 C, 83 D, 81, 82, 90 R, 42 D, 6; 74/480 R, 471 R, 471 XY, 479; 416/25, 27

[56] References Cited
UNITED STATES PATENTS

| | | | |
|---|---|---|---|
| 2,071,063 | 2/1937 | De Florez et al. | 244/42 D |
| 2,447,469 | 8/1948 | Sparagen | 74/480 |
| 2,458,845 | 1/1949 | Gardner | 74/480 X |
| 2,501,726 | 3/1950 | Knox | 244/42 D |
| 2,584,038 | 1/1952 | Morrison | 244/83 R |
| 2,612,329 | 9/1952 | Crandall et al. | 244/83 R X |
| 2,703,988 | 3/1955 | Stevens | 74/479 X |
| 3,403,734 | 10/1968 | Herrmann | 416/25 |
| 3,464,651 | 9/1969 | Lightfoot | 244/6 X |

Primary Examiner—Trygve M. Blix
Assistant Examiner—Barry L. Kelmachter
Attorney, Agent, or Firm—Armand G. Marin, Sr., Darrell G. Brekke, John R. Manning

[57] ABSTRACT

A system for altering the lift/drag characteristics of powered aircraft to provide a safe means of glide path control includes a control device integrated for coordination action with the aircraft throttle. Such lift/drag alteration devices as spoilers, dive brakes, and the like are actuated by manual operation of a single lever coupled with the throttle for integrating, blending or coordinating power control with control of the lift/drag ratio of aircraft. Improper operation of the controller is inhibited by safety mechanisms.

2 Claims, 4 Drawing Figures

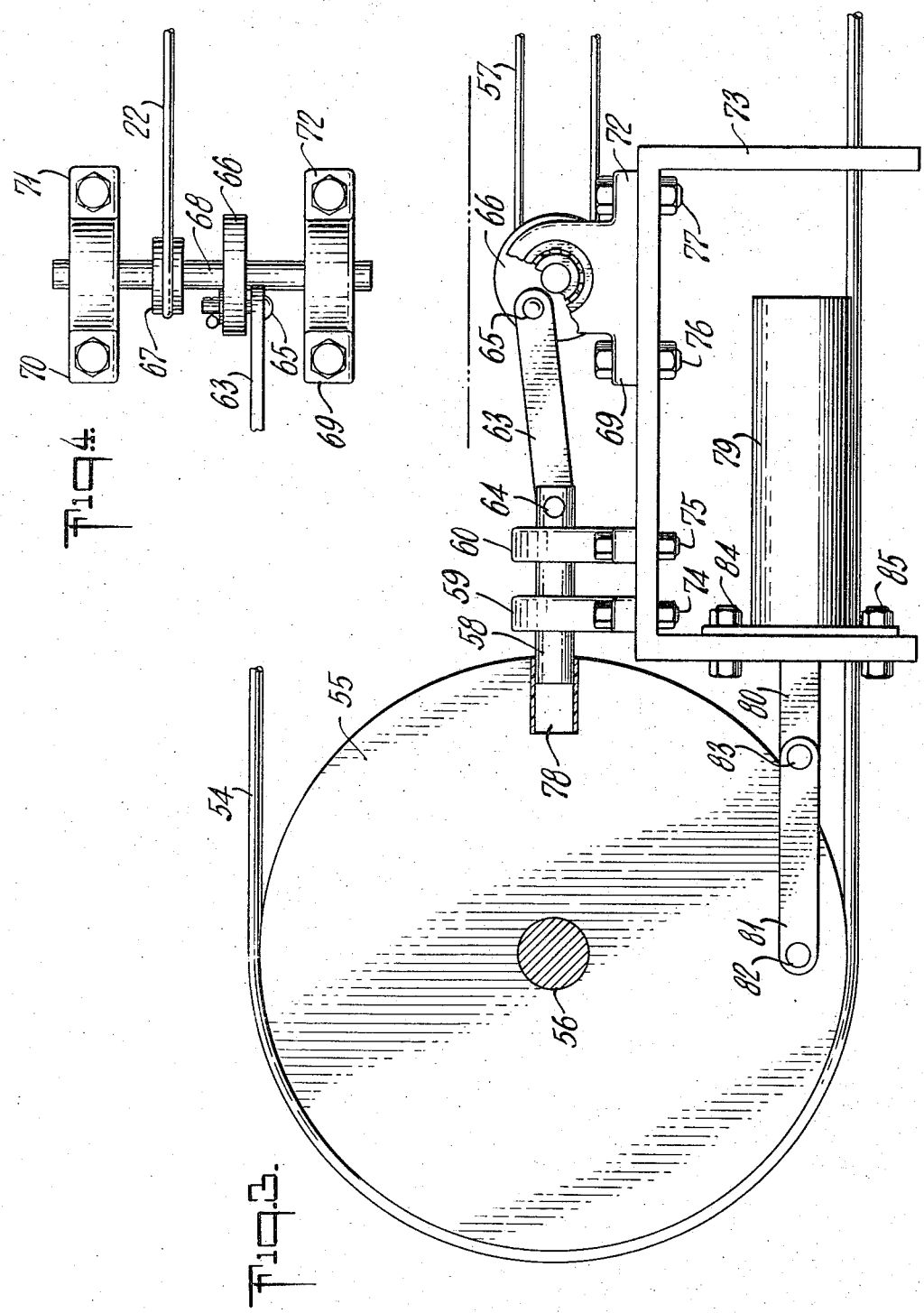

INTEGRATED LIFT/DRAG CONTROLLER FOR AIRCRAFT

BACKGROUND OF THE INVENTION

1. Field of the Invention

This invention relates to the control of spoilers, dive brakes, combinations thereof, or other aerodynamic divices which are capable of altering the lift/drag ratio of a power aircraft. More particularly, the invention relates to an integrated control device for improving a pilot's modulation and control of glide path angle and airspeed for approach, flare, touchdown, rollout, go-around, and emergency descent phases of operation of aircraft.

2. Description of the Prior Art

The landing, which includes the approach, the flare, the touchdown, the rollout, and the go-around, represemts a critical task which a pilot must master for safety of flight. The pilot needs to modulate and control glide path angle in order to approach a runway, flare, and then touchdown within the desired landing zone. He needs to control his airspeed within limits which are fast enough to prevent a stall or undesired settling prior to touchdown, and yet are slow enough to prevent an improper flare, excessive floating after the flare, and/or a poor touchdown. After touchdown, the pilot needs to keep the aircrafts's landing gear firmly situated on the runway, and the aircraft should decelerate quickly to prevent bouncing into the air due to gusts, crosswinds, or improper manipulation of the longitudinal control wheel. Furthermore, the plane must have its weight firmly positioned on the main landing gear so that wheel braking can be effective and directional control can be maintained. During go-arounds, the pilot needs to control glide path and airspeed to achieve the necessary climb performance and to prevent a dangerously slow airspeed.

Emergency descents caused by engine failure require the pilot to make a power-off landing; thus, all the elements of a normal approach, flare, touchdown, and rollout are present, together with the added complication that power is not available for glide path corrections. Emergency descents with power, which might be caused by a pressing need to descend rapidly to a lower altitude, or by the pilot becoming disoriented, require the pilot to control airspeed to prevent a dangerously high velocity.

Thus, the safe and effective modulation and control of glide path angle and airspeed are critical to successful flight operations during landing and during emergency descents.

Altering the lift to drag ratio of an aircraft provides an effective means of changing glide path angle for approach an for go-around. The size of the lift/drag change determines the size of the glide path angle change the pilot can achieve, and the nature of the aircrafts's initial response to the lift/drag change determines the usefulness of the lift/drag alteration device as a means for modulating glide path angle. If the aircraft's initial change in glide path angle due to a change in lift/drag ratio is in the same direction as the desired ultimate change in glide path angle, lift/drag alteration devices can be used easily and effectively to modulate glide path. A change in lift/drag ratio such that lift is reduced while drag is increased, and vice versa, produces the desired initial changes for favorable glide path modulation. If the lift/drag ratio can be varied in a manner which introduces no overall changes in trim airspeed, the pilot can control glide path while maintaining airspeed at the desired value.

During the flare and touchdown maneuvers, a change in lift/drag ratio such that lift is redued while drag is increased is an effective means of reducing the floating tendency of the aircraft if the approach airspeed is too fast, and it is an effective means of causing the touchdown to occur when and where the pilot desires it to happen. During rollout, a reduction in lift causes ground contact to be firm, and an increase in drag causes the rapid reduction in velocity from flight speed to a safe taxi speed. For go-arounds, an immediate increase in the lift capability of the wing and a large reduction in the drag is advantageous for safe operation. For emergency descents, prior to landing, large amounts of drag prevent an excessive buildup in airspeed normally associated with rapid descents or loss of control due to pilot disorientation.

Spoiler and spoilers combined with dive brakes to form a spoiler/drive brake system can provide the desirable lift/drag ratio changes which are favorable for landings and emergency descents. Other aerodynamic devices, such as boundary layer control systems, flaps, and negative thrust-producing propellers, also are capable of altering the lift/drag ratio of aircraft. Exemplary of spoilers and dive brakes used in the past and of the general type which could be used or modified for use herein, are those disclosed in U.S. Pat. Nos. 2,458,845, No. 2,501,726, and No. 2,612,329.

Spoliers and spoiler/dive brake systems have been used on unpowered gliders and sailplanes for many years to provide favorable modulation and control of glide path angle and airspeed for the landing and emergency descent tasks. Their application to powered aircraft for similar purposes has not been successful because a natural and easy-to-use device for controlling the lift/drag alteration devices has not been provided where a throttle was needed to control engine power.

The method of controlling lift/drag alteration devices on powered aircraft is critical, since the improper operation of such devices can compromise the performance of the aircraft and, hence, jeopardize flight safety. For example, if the pilot misapplied a spolier/dive brake system such that they were fully deployed when he attempted to effect a full power climb, the aircraft might be incapable of climbing. At the least, its climb performance would be seriously curtailed. During takeoff or balked landing go-around, the simultaneous application of full spoilers/dive brakes and full throttle would be dangerous. Furthermore, the transition from one lift/drag configuration to another needs to be smooth and coordinated so that no abrupt changes in flight conditions occur.

In addition to safety considerations, means for controlling lift/drag alteration devices such as spoilers/dive brakes must provide the pilot with an easy and natural way to modulate flight path angle. Since the power plane pilot must have one hand on the longitudinal control (joy stick or control wheel) and he needs the other hand for manipulation of the throttle during landing, the physical location, orientation, and operation of the controller for the lift/drag alteration device must be such that the pilot can adapt easily to its functions. Use of the device must present no new piloting techniques which might conflict with previously learned procedures, and the device must provide the pilot with a means of modulating glide path angle in a continuous and coordinated manner.

Furthermore, operation of the lift/drag alteration devices for emergency descent must be natural and must not conflict in any way with the control or operation of the lift/drag alteration device during the landing task.

De Florez et al, U.S. Pat. No. 2,071,063, disclosed a combined throttle and brake control intended to simplify the operation of air brakes. However the control of De Florez et al did not permit real coordination of throttle and brake control but only the alternatives of application of brakes or control of power. There is no integration of control in this prior art device, since L/D control and engine power cannot be readily blended and coordinated.

An authoritative, nautral and easy to use glide path control device has long been desired in aviation. The present invention overcomes the problems of the prior art by providing an integrated lift/drag controller which can be operated in conjunction with the throttle or throttles of a powered aircraft.

SUMMARY OF THE INVENTION

The controller of this invention enables an aircraft pilot to integrate, blend and coordinate the operation of a lift/drag alteration system with throttle control of engine power by manipulation of an integrated lever arrangement in a manner similar to the natural use of a throttle alone.

In a preferred embodiment of the invention a throttle lever and an L/D control lever are mechanically coupled for coordinated control of engine power and L/D alteration in all of the relationships of these factors which are appropriate to safe glide path selection. Handles for the two levers are preferably so positioned that they effectively constitute a split handle which can be used as if it were a throttle. The individual handles may be moved relative to each other to a limited extent to allow adjustment of the relationship between the engine power and the extent of lift/drag alteration. To avoid inappropriate use of the L/D control, a mechanism is preferably provided to inhibit in appropriate relative movement of one handle with respect to the other.

In the split handle embodiment of the controller, both handles can be gripped and moved simultaneously, or the L/D control handle can be split away from the throttle handle for additional L/D alteration. Thus, when the two levers are operated as a single handle, there is no actuation of the L/D altering device while the engine is at full power, but as the throttle is moved toward a position for idle engine power, the L/D control brings the L/D altering device into some intermediate position. Moving both components of the split handle together as one handle thus coordinates the deployment of spoilers or other L/D altering means with a cut down in engine power.

The split handle embodiment of the controller also permits limited movement of the L/D control lever forward or aft of the throttle position for special control situations. As a safety measure such independent movement is limited and means are preferably provided to indicate that the controls are not in a coordinated position.

Because of the coupling of the two levers, an attempt to move the L/D control beyond a permissible degree of separation from the throttle lever results in a following motion of the throttle.

Although the embodiment to be described in detail is illustrative of a split handle controller, it will be clear that a single handle could be employed with some loss of flexibility of control. The use of two independent handles would require greater skill than use of the split handle described, and would place special operating demands on the pilot. Various arrangements for coupling the L/D control with the thottle will suggest themselves. The specific arrangement to be described in illustrative of a very effective means of integrating glide path controls.

Therefore, a principal object of the invention is to provide an integrated lift/drag control device for aircraft which will allow the pilot to modulate glide path angle in a manner which is coordinated with the aircraft throttle so that the normal functions of the throttle are maintained and improved for modulation and control of glide path angle and airspeed.

Another object of the invention is to provide an integrated lift/drag control device for aircraft which will allow for the integration or blending of throttle usage in a manner which the pilot finds easy and natural to use.

A further object of the invention is to provide an integrated lift/drag control device which will allow the independent operation of both throttle and integrated lift/drag control device when the pilot desires to use the throttle and lift/drag alteration device is a non-coordinated manner.

A still further object of the invention is to provide an integrated lift/drag device that can be incorporated into the design and manufacture of simple mechanical systems, as well as sophisticated electronic or servo-control systems involving lift/drag alteration devices.

The construction, arrangement, and combination of the various parts of the device, whereby these objects are attained is more fully set forth in the following detailed description, taken in conjunction with the accompanying drawings.

BRIEF DESCRIPTION OF THE DRAWINGS

FIG. 3 is a side view of a typical mechanically operated drive and lock arrangement for applying an operating torque on the drive shaft of an L/D alteration device such as spoilers/dive brakes in connection with an integrated controller according to the invention.

FIG. 4 is a top view in detail of a portion of the locking mechanism of FIG. 3.

DESCRIPTION OF A PREFERRED EMBODIMENT

Figure 1:
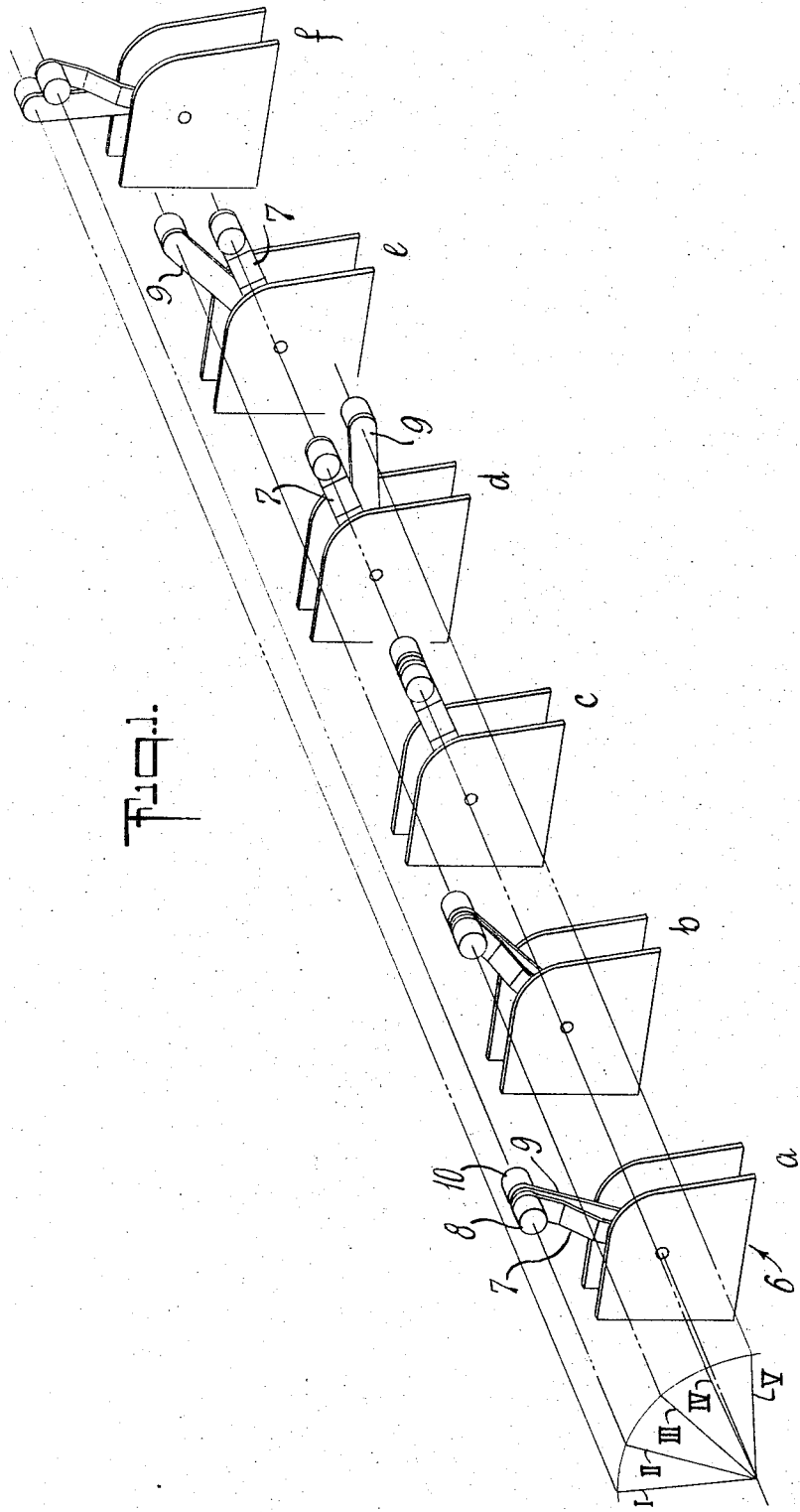
FIG. 1 is a schematic illustration of the operation of a split-handle embodiment of the integrated controller of the invention, in which stages *a* through *f* illustrate handle positions for different phases of operation.
Figure 2:
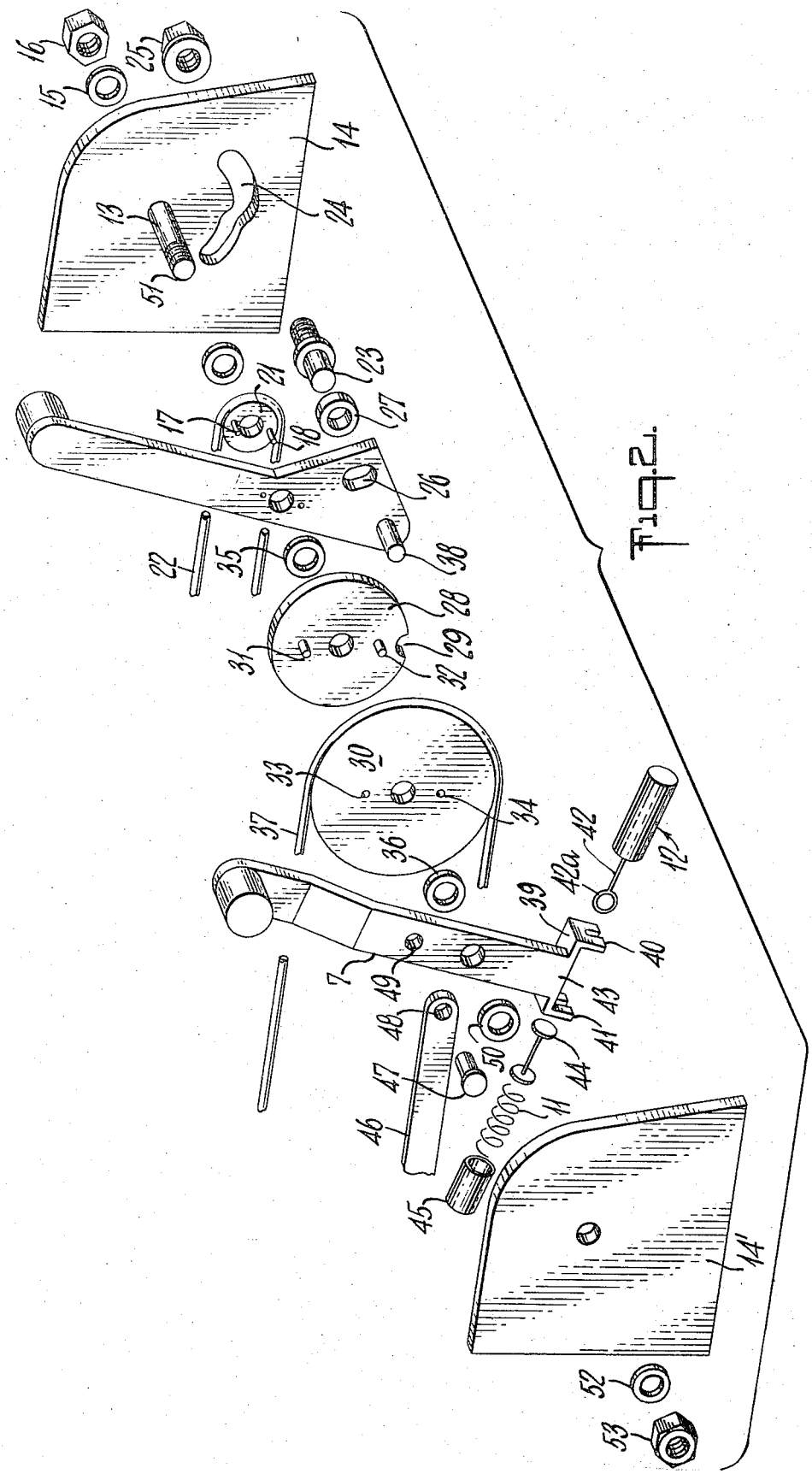
FIG. 2 is an exploded perspective view of the controller of FIG. 1, showing the relative positions of internal working parts.

A preferred embodiment of the integrated controller of the invention is shown in FIGS. 1 and 2 with split handle manual controls. As will appear more fully in the following description, this split handle control provides ample flexibility for control of a flight path under the various conditions of aircraft operation, while insuring safety. Two completely separate handles could be provided, but would demand greater attention and skill in operation. Various degrees of coupling of the throttle with the lift/drag control have been considered, and the split handle arrangement shown has been found to be superior to other systems. A still simpler arrangement using a unitary handle could be utilized with some sacrifice of flexibility of control, since in many phases of operation the split handle is used as if it were a unitary hndle. The embodiment shown is ilustrative of a preferred form of controller, which can be used for widely varying types of glide path control as shown by the handle positions $a - f$ of FIG. 1.

In FIG. 1 the reference numeral 6 designates the base or housing of the integrated lift/drag ratio control device. Projecting from the base 6 are a throttle lever 7 carrying a throttle handle 8 and a lift/drag control lever 9 carrying a lift/drag handle 10. The abbreviation "L/D" is used throughout this specification to mean lift/drag ratio.

Among L/D altering devices are spoilers, dive brakes, combinations of spoilers with dive brakes and other known mechanisms. For simplicity, the term spoilers will be used throughout this specification, but it should be understood that the controller is intended for use with various types of L/D altering devices by which lift and drag are changed in a mutually inverse relation and that spoilers are referred to as an example only of such L/D devices that can be effectively controlled in accordance with the invention.

Several relative positions of the throttle lever 7 and L/D lever 9 are shown at $a - f$ in FIG. 1. The divisions I –]V of the quadrant at the lower left in FIG. 1 indicate positions from farthest forward (I) to farthest aft (V) which can be assumed by either the lever 7 or the lever 9 during operation. As shown in the drawing the L/D lever 9 may be moved to any position from I (at phase $a$) to V (at phase $f$). The throttle lever 7 can, however, only move between positions II AND IV.

When the throttle lever 7 is in position II as at phase $a$, the engine is at full power. Position IV of the throttle lever, as shown at $c - e$ represents idle engine power. The intermediate position III of lever 7 is the handle location for an engine power corresponding to a slow cruise airspeed at or near the power required for level flight at the nominal approach speed of 1.4 times the stalling speed in the landing configuration. The exact power setting corresponding to position III depends upon the characteristics of the specific aircraft that incorporates the integrated L/D controller, but it is always a power setting greater than idle power and less than full power.

The L/D lever 9 has a wider range of movement than the throttle lever 7. Position III, however, of the lever 9 is the position at which the L/D alteration device first becomes active. Thus, between positions I and III, movement of the lever 9 does not engage or actuate the L/D alteration device.

Position IV of the L/D lever 9 represents an intermediate state of deployment of the L/D alteration device. The exact extent to which the L/D device is deployed or extended when the lever 9 is at position IV depends on the characteristics of the specific aircraft employing the L/D device and on the characteristics of the L/D alteration device itself. It is some position of less than maximum L/D alteration. Position V of the L/D lever 9 is for full engagement or deployment of the L/D alteration device.

Having described the function of the levers 7 and 9, the cooperation of the throttle and L/D controls will now be explained with reference to FIG. 1. A suitable mechanism for coupling the levers 7 and 9 for coordinated movement will be explained in connection with FIG. 2. Phases $a$, $b$, and $c$ of operation illustrate the use of the cooperating handles 8 and 10 together as a single control. At $a$, with both levers at position II, the engine is at full power, and the L/D alteration device is inactive. Moving the combined split handle 8, 10 aft decreases engine power as in ordinary throttle operation. When the combined split handle 8, 10 has been moved aft to the disposition shown at $b$ the spoilers or other L/D alteration device are initially activated. This initial activation takes place when engine power has been reduced to low cruise speed. Further movement aft of the combined split handle 8, 10 further reduces engine power and further extends or deploys the L/D alteration device, so that at the stage shown at $c$ the engine is idling and the spoilers or other L/D alteration device are in an intermediate position. Of course the split handle 8, 10 can be used as a single control forward of the position shown at $b$ since it then operates only as a throttle. In effect the pilot uses the split handle 8, 10 at and between the orientations shown at $a$, $b$, and $c$ as though it were a throttle. Such use of the split handle maintains and improves the normal functions of the throttle for modulation and control of glide path angle and airspeed by adding the coordinated function of the L/D device as the split handle 8, 10 is moved aft of the point shown at $b$. The actions of the L/D lever 9 and the throttle lever 7 are thus integrated and blended in a manner which the pilot finds easy and natural to use by moving both controls simultaneously.

Besides using the split handle 8, 10 as a single control, moving both handles simultaneously, the individual handles may be split, and, to a limited degree, the engine power and L/D device can be independently controlled. This feature provides great flexibility of control. For example, when descent capabilities in excess of that associated with the idle power position IV of the throttle lever 7 are desired, the handle 10 can be independently moved aft to position IV and the full deployed L/D device setting of position V. Such relative positioning permits a choice of the additional descent performance desired. At $d$ the throttle lever 7 is set for the power associated with idle power, whereas the L/D lever 9 is set for maximum deployment of the L/D alteration device.

The range of movement of the L/D lever 9 aft of position IV up to and including the setting shown at $d$ may be called the "post-idle" range. It is desirable to provide means for keeping the pilot aware that he is using the L/D alteration device in a manner which is not integrated or blended with throttle control whenever the L/D lever 9 is in this post-idle range. One effective means for supplying this information comprises the use of spring means to cause a force gradient to exist whenever the L/D lever 9 is moved aft of the throttle lever 7. Such a force gradient inhibits movement of the L/D lever 9 aft and away from throttle lever 7. Damping means may also be suitably provided. Thus a one-way damper may advantageously be employed to inhibit the rate at which the L/D handle 9 can move aft of the throttle handle 7, without inhibiting the rate of motion of the L/D handle 9 forward to the throttle handle 7. It has been found especially advantageous to provide both spring biasing means and damping means. With such an arrangement a pilot can apply the full authority of the L/D alteration device by using natural throttle-like movements of the L/D lever 9, but he receives a tactile cue caused by the inhibiting mechanisms, whenever the controls are not integrated and blended.

Furthermore, large amounts of L/D alteration device authority are applied by placing the L/D lever 9 in the special post-idle position V, therefore, the splitting of the L/D handle 10 away from the throttle handle 8 represents a special action which also serves to remind the pilot that full L/D alteration authority is being applied.

The controller levers 7 and 9 are preferably so interconnected that the maximum extent to which the L/D lever 9 can be moved aft of the throttle lever 7 in any location between and including position I, II, III, IV and V is the arc length between position IV and position V. The maximum extent to which the L/D lever 9 can be moved forward of the throttle lever 7 in any location between and including positions I, II, III, IV and V is advantageously limited to the arc length between the full position II and farthest forward position I. The L/D alteration device engage position III and the idle power position IV is preferably equal to or less than the arc length between position I, and the full power position II. As will be described in detail hereafter, when the lever 9 is moved to position I the throttle lever 7 is coupled to follow to position II. Also, the arc length between position II and position III is greater than the arc length between position IV and position V. Therefore, the L/D lever 9 can be situtated in a location between positions II and III, whereby the L/D alteration device remains unengaged, while the throttle lever 7 is situated and manipulated in the range between positions III and IV for the purposes of taxiing at idle power or at a power setting greater than idle power. Such a relative positioning of the levers is shown at e in FIG. 1. Furthermore, the pilot can achieve full engine power by advancing only the L/D handle 10 fully forward into position I, thereby forcing the throttle lever 7 into the full engine power position II, should he or she fail to move both the L/D handle 10 and the throttle handle 8 together as if they were one handle. Such a relative positioning on the levers is shown in FIG. 1, at f. Still furthermore, the pilot can advance the throttle lever 7 fully forward to position II and force the L/D lever 9 forward of the engage position III and thus cause the L/D alteration device to be fully closed or retracted. Such a relative positioning of the levers is not shown in FIG. 1, but should be obvious from the discussion of the limited extent of separation of the levers allowed.

The throttle lever 7 and the L/D lever 9 as described above can be operated independently for taxiing. The levers 7 and 9 can be operated independently for special-purpose operations, such as leaving the throttle at a cruise or slow flight location between position II and position IV so that the engine stays at the proper operating temperature while the aircraft is in a rapid descent caused by the L/D alteration device being deployed because the L/D lever 9 is located between positions III and V. Furthermore, any operation which advances fully either the throttle lever 7 or the L/D lever 9 will result in the L/D alteration device being returned to its fully closed or retracted position and the engine being operated at full power. Thus, improper coordination of the throttle lever 7 and the L/D lever 9 is inhibited and the reliable operation of the integrated L/D control device under conditions where the pilot does not grasp both handles 8 and and 10 simultaneously has been assured.

The maximum arc length displacements for and aft between the throttle lever 7 and the L/D lever 9 are determined by components of the mechanical coupling arrangement. A suitable arrangement is shown in FIG. 2. As shown in FIG. 2, the throttle lever 7 and the L/D lever 9 rotate n the same shaft 13 which is swaged and fitted into the right-hand side 14 of the integrated L/D control quadrant. The shaft 13 is retained in place by a washer 15 and self-locking nut 16. Fastened to the L/D lever 9 by means of pins 17 and 18 is an L/D lock-unlock wheel 21. The L/D lock/unlock wheel 21 rotates on shaft 13 along with the L/D lever 9 and, thus, can be used to operate via cable 22 a mechanical locking cylinder 58 (shown in FIG. 3) which locks a drive shaft or torque tube 56 of an L/D alteration device such as spoilers/dive brakes system when the L/D lever 9 is in psoition I or any position between I and III of the illustration in FIG. 1; and unlocks the torque tube 56 when the L/D lever 9 is in any position between and including positions III and V in FIG. 1, the motion of the L/D lock/unlock wheel 21 also could be used to activate an electric, hydraulic, or servo-operated locking-/unlocking mechanism.

The movement of the L/D lever 9 causes an L/D engage pin 23 to slide in an L/D engage cam slot 24. The L/D engage pin 23 is retained in L/D engage cam slot 24 by means of a self-locking washer nut 25. The L/D engage pin 23 also extends through the L/D lever drive slot 26 located in the L/D lever 9. A low friction washer 27 separates the L/D engage pin 23 from the L/D lever 9 to ensure smooth sliding between the two elements. The fit between the L/D engage pin 23, the L/D engage cam slot 24, and the self-locking washer nut 25 must be such that the L/D engage pin 23 can slide along the L/D engage cam slot 24 without binding as it is forced to move by the action of the L/D lever 9. The L/D engage pin 23 can slide along the L/D engage cam slot 24 without binding as it is forced to move by the action of the L/D lever 9. The L/D engage pin 23 can slide upwards towards the shaft 13 as it follows the direction of the L/D engage cam slot 24. As the L/D lever 9 moves to position III in FIG. 1, the L/D engage pin 23 moves under the action of L/D lever 9 and the L/D engage cam slot 24 so that it engages an L/D control wheel 28 by positioning itself in a semicircular cutout 29 in the L/D control wheel 28. Thus, from position III to position V, the L/D lever 9 activates and rotates the L/D control wheel 28.

When the L/D lever 9 moves forward through position III towards position II and I, the L/D engage pin 23 is forced to disengage from the semicircular cutout 29 because of the need to follow the path of motion detemined by the L/D engage slot 24 and the position of the L/D lever 9. The L/D control wheel 28 is fastened to an L/D alteration device drive wheel 30 by two pins 31 and 32 which fit into holes 33 and 34 in the L/D alteration device drive wheel 30. Both the L/D control wheel 28 and the L/D alteration device drive wheel 30 rotate as one piece on the shaft 13. The L/D control wheel 28 is separated from the L/D lever 9 by a low friction washer 35, and the L/D alteration device drive wheel 30 is separated from the throttle lever 7 by a low friction washer 36. Rotation of the L/D alteration device drive wheel 30 is transmitted to the L/D alteration device torque tube 56 (FIG. 3) via cable 37. Both the L/D lock/unlock wheel 21 and the L/D alteration device drive wheel 30 cause their respective cables 22 and 36 to move without slippage between the cables and the wheels. The motion of the L/D control wheel 28 also could be used to control an electrical, hydraulic, or servo-controlled L/D alteration device.

A throttle-L/D lever coordination pin 28 is situated between ends 40 and 41 of a throttle coordination bracket 39 of the throttle lever 7. A one-way damper 12 is fastened to the throttle-L/D lever coordination pin 38 by means of a shaft 42 having a ring 42 a for encircling the pin 38. The one-way damper 12 is also fastened to the end 40 of the throttle coordination bracket 39. The one-way damper 12 is found to have sufficient stroke to function anywhere between ends 40 and 41, and the damper 12 only inhibits the rate of aft motion of the L/D lever 9 with respect to the throttle lever 7. The distance between the center 43 of the throttle lever 7 and the end 40 of the throttle coordination bracket 39 is just long enough to allow the L/D handle 10 to advance forward of the throttle handle 8 by the arc length between positions I and II in FIG. 1. The distance between the center 43 of the throttle lever 7 and the end 41 of the throttle coordination bracket 39 is just long enough to allow the L/D handle 10 to retard aft of the throttle handle 8 by the arc length between positions IV and V in FIG. 1. A spring guard 4 connected to a compression spring 11 located in a spring housing 45 resists the throttle coordination pin 38 when it is between the throttle center location 43 and the end of the throttle coordination bracket 41, and thus, the spring 11 causes the L/D lever 9 to work against a force gradient whenever the L/D handle 10 is retarded aft of the throttle handle 8. The spring housing 45 is fastened to end 41 of the throttle coordination bracket 39.

The throttle lever 7 is connected to a throttle linkage 46 by a typical aircraft fastener such as a clevis pin 47 which goes through fastening holes 48 and 49. The throttle lever 7 rotates on shaft 13 and is separated from the left-hand side 14' Of the integrated L/D control housing 6 by a low friction washer 50. The shaft 13 is retained at its left-hand end 51, which is threaded, by a low friction washer 52 and a self-locking nut 53.

Reference is now made to FIGS. 3 and 4 illustrating an effective arrangement for application of the controller of the invention to the activating mechanism of an L/D alteration system, such as a spoilers/dive brakes system having a drive shaft wheel 55 and a torque tube or drive shaft 56. Cable 54 is shown in FIG. 3 connected by an L/D drive shaft wheel 55 to the torque tube or drive shaft 56 of the L/D alteration device, and causes the torque tube or drive shaft 56 to rotate proportionally to the position of the L/D lever 9. Cable 54 could be connected directly to cable 37 shown in FIG. 2 through appropriate drive wheels, or it could be connected to an electric or hydraulic servo-actuator that would be controlled by the rotation of the L/D alteration device drive wheel 30.

A cable 57 is connected to an L/D alteration device locking mechanism consisting of a locking cylinder 58, locking cylinder ball bushings 59 and 60, a locking cylinder connecting rod 63, and connecting pins 64 and 65, a locking cylinder drive wheel 66, a locking mechanism drive wheel 67, a locking mechanism drive shaft 68, and locking mechanism ball bearing supports 69, 70, 71 and 72. Cable 57 could be connected directly to cable 22 (FIG. 2) through appropriate drive wheels as shown or it should be connected to an electric or hydraulic servo-actuator that would be controlled by the rotation of the L/D lock/unlock wheel 21. The L/D alteration device locking mechanism is mounted on a bracket 73 by means of standard aircraft fasteners 74, 75, 76, and 77. Rotation of the L/D lever 9 causes the locking mechanism drive wheel 67 to rotate, which in turn causes the locking cylinder 58 to move in the cooperating cutout 78 in the L/D drive shaft wheel 55. The linear motion of the locking cylinder 58 is controlled by the position of the L/D lever 9 such that the locking cylinder 58 moves clear of the L/D drive shaft wheel cutout 78 just as the L/D lever reaches the engage position III.

A one-way damper 79 is shown connected to the L/D drive shaft wheel 55, via connecting rods 80 and 81 and connecting pins 82 and 83, to dampen any sudden rotation of the L/D alteration device drive shaft 56 due to any residual torque that might exist on the shaft 56 at the moment the locking cylinder 58 became clear of the L/D drive shaft wheel cutout 78. The one-way damper 79 is fastened to the support bracket 73 by standard aircraft fasteners 84 and 85, and it is ported so that its damping action only functions during the first 5° to 10° of rotation of the L/D torque tube or drive shaft 56, depending on the specific characteristics of the L/D alteration device and the aircraft to which it was mounted, and thus, does not interfere with the normal operation of the integrated L/D controller.

The controller of the invention is particularly well adapted for use with spoilers/dive brakes, since the action of spoilers decreases lift while increasing drag, offering greater control over the lift to drag ratio than do flaps, which increase both lift and drag at the same time. However, it would be obvious to adapt the controller for use with flaps if a drag altering means were used along with the flaps. Similarly, the principles of this invention could be adapted to use with other L/D alteration devices such as boundary layer control systems, negative thrust on propellers, etc. What is disclosed is a means for integrating control of engine power with control of the lift/drag ratio in aircraft.

Numerous modifications, substitutions and changes within the spirit and scope of the invention will obviously suggest themselves to those of ordinary skill in the art, and the specific structure described in detail is set forth as a non-limiting examples of a preferred embodiment of the invention.

What is claimed is:

1. In a powered aircraft having horizontal fixed wing structure and an L/D alteration system, including adjustable flaps attached to said wing structure, means for controlling said L/D alteration system including an L/D control lever for actuation and control of the extent of operation of the L/D altering system; throttle means, including a throttle lever, and means coupling said throttle lever with said L/D control lever, whereby movement of said L/D control lever produces coodinated changes in engine power and L/D alteration, said L/D control lever including spring means for producing a force gradient when said L/D lever is moved improperly with respect to said throttle lever.

2. A control device for integrating the control of engine power with the control of an L/D alteration system in aircraft of the type having a throttle for regulating engine power between positions of reduced power and maximum acceleration to improve the normal functions of the throttle for modulation and control of glide path angle and airspeed, the control device including a throttle lever and an L/D lever, said levers being positioned for synchronous movement upon manual operation of both levers as a single control between a position of maximum acceleration with no L/D alteration and a position of reduced power with considerable L/D alteration, wherein said levers are independently movable to a limited extent, and including means for inhibiting improper movement of the L/D lever away from the throttle lever, said inhibiting means including spring means for producing a force gradient when said L/D lever is moved improperly with respect to said throttle lever.

* * * * *